United States Patent
Lin et al.

(10) Patent No.: US 9,798,103 B2
(45) Date of Patent: Oct. 24, 2017

(54) LENS FIXING MECHANISM AND IMAGE CAPTURING DEVICE THEREOF

(71) Applicant: VIVOTEK INC., New Taipei (TW)

(72) Inventors: Chih-Hung Lin, New Taipei (TW); Chih-Chieh Chan, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 15/347,773

(22) Filed: Nov. 9, 2016

(65) Prior Publication Data
US 2017/0146768 A1    May 25, 2017

(30) Foreign Application Priority Data
Nov. 20, 2015  (TW) .............................. 104138457 A

(51) Int. Cl.
*G02B 7/02* (2006.01)
*H04N 5/225* (2006.01)

(52) U.S. Cl.
CPC .......... *G02B 7/026* (2013.01); *H04N 5/2254* (2013.01)

(58) Field of Classification Search
CPC .......... G02B 7/026; G02B 7/02; G02B 7/003; G02B 7/1825; G02B 25/005; G02B 7/021; G02B 7/022; G02B 7/023; H04N 5/2254
USPC ........................................ 359/811, 818, 819
See application file for complete search history.

(56) References Cited

U.S. PATENT DOCUMENTS

| | | | |
|---|---|---|---|
| 6,400,516 B1 * | 6/2002 | Spinali | G02B 7/023 359/818 |
| 6,842,299 B2 * | 1/2005 | Duon | G02B 7/02 359/811 |
| 7,379,253 B2 * | 5/2008 | Kawamura | G02B 7/026 348/340 |
| 2002/0027725 A1 * | 3/2002 | Schletterer | G02B 7/023 359/811 |
| 2010/0118550 A1 * | 5/2010 | Kuo | H01L 33/58 362/311.02 |
| 2012/0167741 A1 * | 7/2012 | Duffy | A01G 3/053 83/697 |

FOREIGN PATENT DOCUMENTS

| | | |
|---|---|---|
| CN | 202886700 U | 4/2013 |
| TW | 201400968 | 1/2014 |

* cited by examiner

*Primary Examiner* — James Greece
(74) *Attorney, Agent, or Firm* — Winston Hsu

(57) ABSTRACT

A lens fixing mechanism includes a lens base having a hollow structure and a breach structure formed on the hollow structure and a lens clamp. A ring portion of the lens clamp has an opening and a protruding structure. Two sheets extend outwardly from the opening. The protruding structure protrudes from a periphery toward a center of the ring portion. When the ring portion sleeves the hollow structure to insert the protruding structure into the breach structure and a lens module is inserted into the hollow structure, the sheets are connected to each other to pack the ring portion to contract inwardly, so as to make the protruding structure pass through the breach structure for clamping the lens module and make a portion of the periphery of the ring portion except the protruding structure to clamp a portion of a periphery of the hollow structure except the breach structure.

12 Claims, 5 Drawing Sheets

LENS FIXING MECHANISM AND IMAGE CAPTURING DEVICE THEREOF

BACKGROUND OF THE INVENTION

1. Field of the Invention

The present invention relates to a lens fixing mechanism and an image capturing device thereof, and more specifically, to a lens fixing mechanism utilizing a protruding structure of a lens clamp to pass through a breach structure of a lens base for clamping a lens module and an image capturing device thereof.

2. Description of the Prior Art

In general, a conventional image capturing device (e.g. a monitoring camera) utilizes a lens module to focus received images on an image sensor (e.g. CCD (Charge Couple Device), CMOS (Complementary Metal Oxide Semiconductor sensor)) for image capturing. Thus, when the lens module is deflected, the image capturing quality of the image capturing device is influenced greatly so as to cause local image blur. Assembly misalignment or loosening between the lens module and a lens base for fixing the lens module is the main reason of the aforesaid deflection of the lens module.

In practical application, a conventional method for fixing the lens module to the lens base involves locking screws into the lens base for clamping the lens module after the lens module is disposed through the lens base, so as to prevent the lens module and the lens base from loosening when the lens module and the lens base receive external impact. Furthermore, in another conventional fixing method, the lens module could have damping oil coated thereon and could be screwed into the lens base for filling the thread gap between the lens module and the lens base with the damping oil, so as to prevent the lens module and the lens base from loosening.

The aforesaid methods usually cause deflection of the lens module due to the uneven screwing force and uneven coating of the damping oil. Furthermore, the fixing method for utilizing the screws to clamp the lens module could also cause damage of the lens module due to the excessive screwing force. The aforesaid problems could be solved by utilizing a C-shaped clamp to pack the lens base for causing inward deformation of the lens base. Accordingly, the lens module could be clamped tightly by the C-shaped clamp and the inwardly-deformed lens base. However, this fixing method not only causes elliptical deformation of the C-shaped clamp so that one-sided deflection of the lens module may occur, but also causes the problem that the C-shaped clamp is unable to deform the lens base if the lens base is made of material with high hardness (e.g. metal).

SUMMARY OF THE INVENTION

The present invention provides a lens fixing mechanism for fixing a lens module. The lens fixing mechanism includes a lens base and a lens clamp. The lens base has a hollow structure and a breach structure. The breach structure is formed on a periphery of the hollow structure. The lens clamp has a ring portion and two sheets. The ring portion has an opening and a protruding structure. The two sheets extend outwardly from the opening of the ring portion. The protruding structure protrudes from a periphery of the ring portion toward a center of the ring portion. When the ring portion sleeves the hollow structure to insert the protruding structure into the breach structure and the lens module is inserted into the hollow structure, the two sheets are connected to each other to pack the ring portion to contract inwardly relative to the hollow structure, so as to make the protruding structure pass through the breach structure for clamping the lens module and make a portion of the periphery of the ring portion except the protruding structure to clamp a portion of a periphery of the hollow structure except the breach structure.

The present invention further provides an image capturing device. The image capturing device includes a casing, a lens module, a lens fixing mechanism, and a sensing circuit board. The lens module is disposed in the casing. The lens fixing mechanism is disposed in the casing for fixing the lens module. The lens fixing mechanism includes a lens base and a lens clamp. The lens base has a hollow structure and a breach structure. The breach structure is formed on a periphery of the hollow structure. The lens clamp has a ring portion and two sheets. The ring portion has an opening and a protruding structure. The two sheets extend outwardly from the opening of the ring portion. The protruding structure protrudes from a periphery of the ring portion toward a center of the ring portion. The sensing circuit board is disposed in the casing. The sensing circuit board has an image sensor disposed thereon. The image sensor is aligned with the lens module. When the ring portion sleeves the hollow structure to insert the protruding structure into the breach structure and the lens module is inserted into the hollow structure, the two sheets are connected to each other to pack the ring portion to contract inwardly relative to the hollow structure, so as to make the protruding structure pass through the breach structure for clamping the lens module and make a portion of the periphery of the ring portion except the protruding structure to clamp a portion of a periphery of the hollow structure except the breach structure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
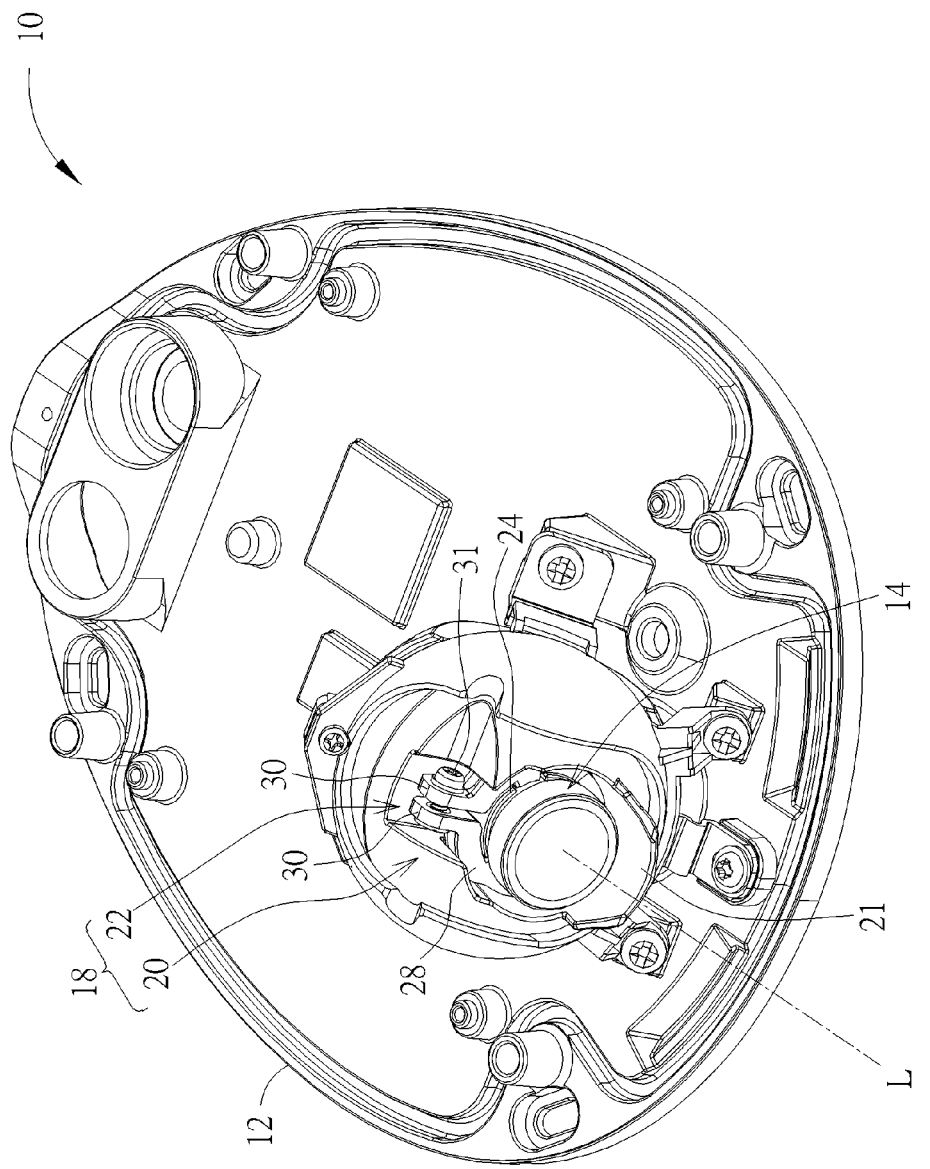
FIG. 1 is a diagram of an image capturing device according to an embodiment of the present invention.
Figure 2:
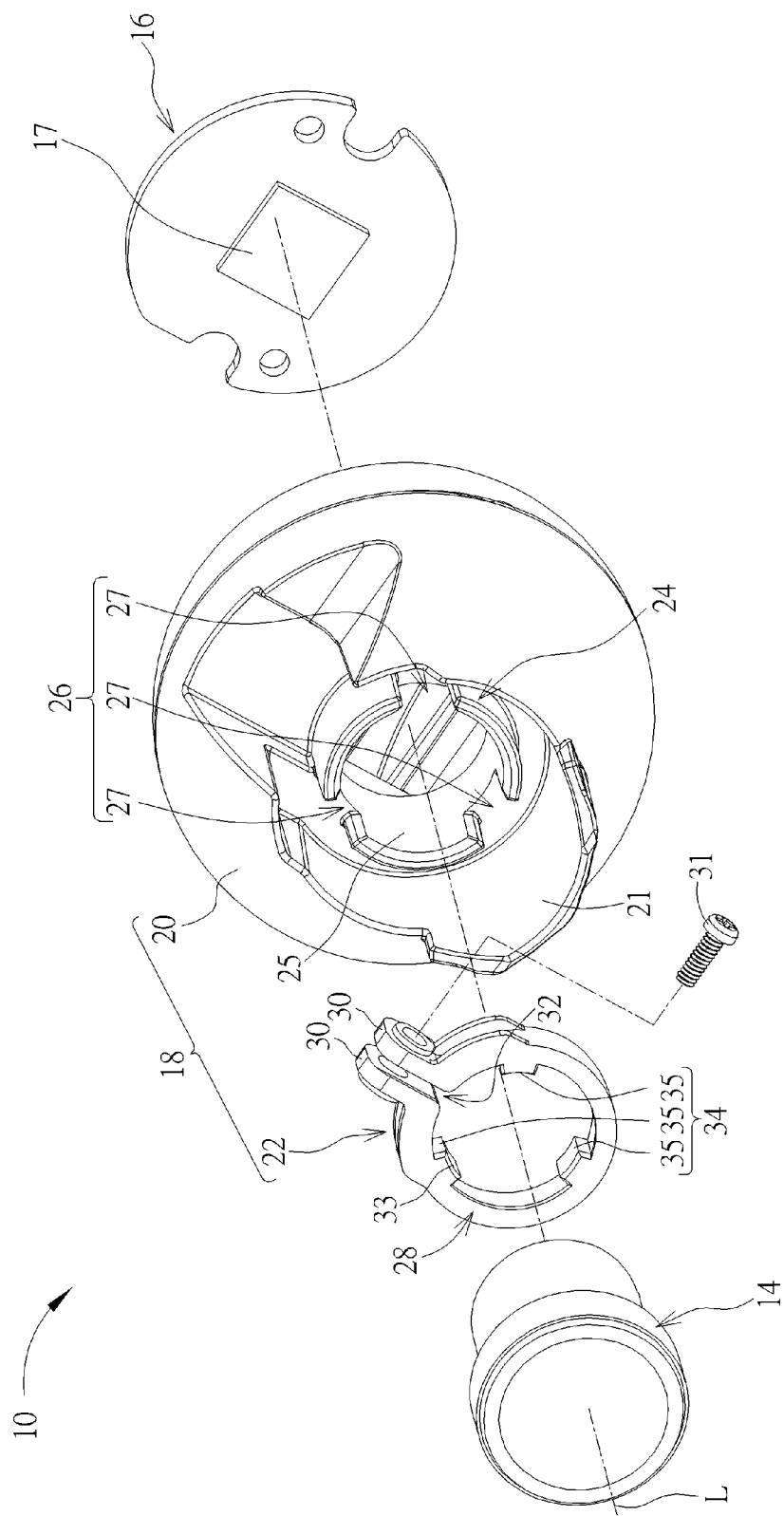
FIG. 2 is a partial exploded diagram of the image capturing device in FIG. 1.

Please refer to FIG. 1 and FIG. 2. FIG. 1 is a diagram of an image capturing device 10 according to an embodiment of the present invention. FIG. 2 is a partial exploded diagram of the image capturing device 10 in FIG. 1. As shown in FIG. 1 and FIG. 2, the image capturing device 10 includes a casing 12, a lens module 14, a sensing circuit board 16, and a lens fixing mechanism 18. For clearly showing the internal structural design of the image capturing device 10, the upper half portion of the casing 12 is omitted in FIG. 1. The lens module 14 is disposed in the casing 12 and is used to capture images for the subsequent image processing (e.g. image surveillance). The sensing circuit board 16 is disposed in the casing 12, and an image sensor 17 is disposed on the sensing circuit board 16 and is aligned with the lens module 14. The image sensor 17 could be a conventional image sensing chip (e.g. CCD, CMOS, etc.) for receiving the images captured by the lens module 14.

Figure 3:
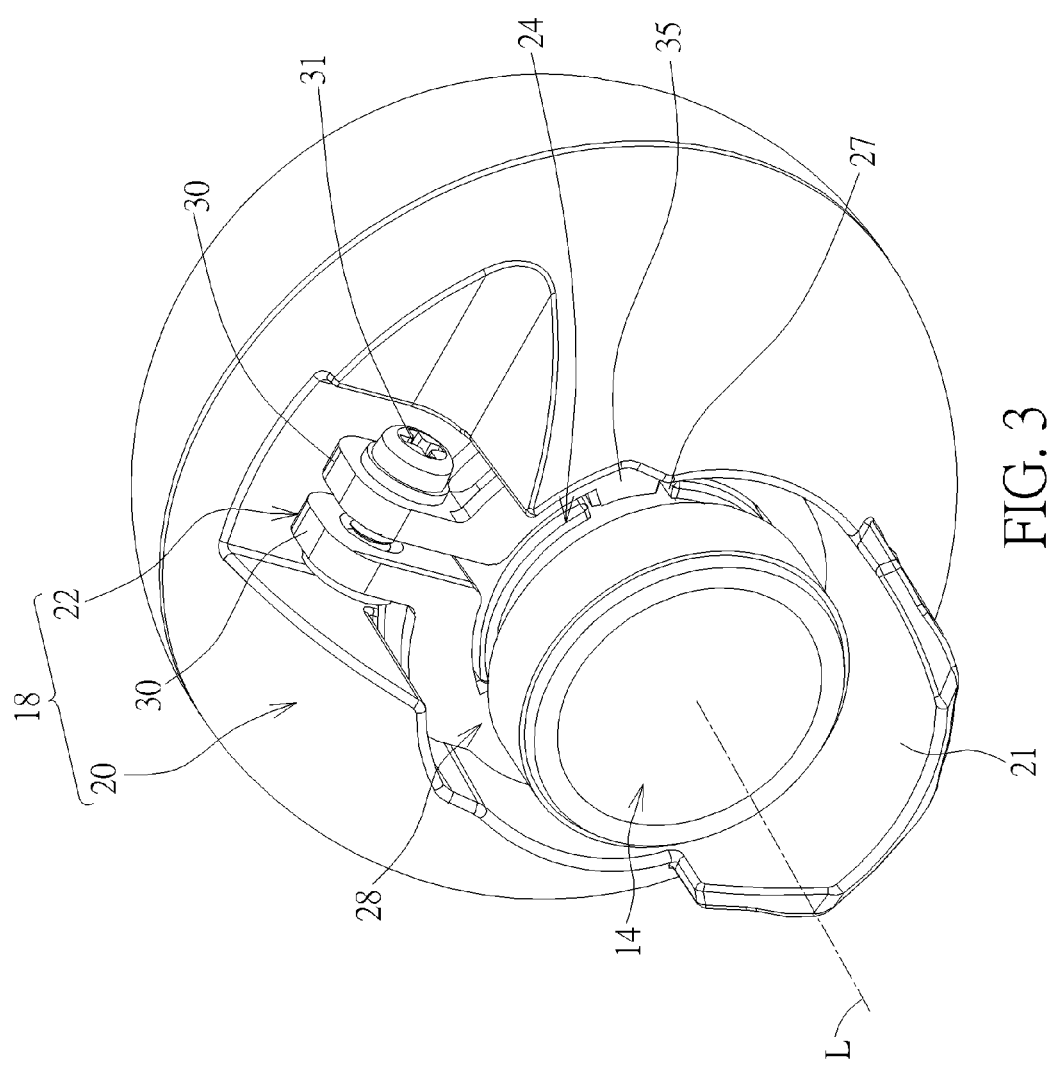
FIG. 3 is an assembly diagram of a lens module and a lens fixing mechanism in FIG. 2.

More detailed description for the mechanical design of the lens fixing mechanism 18 is provided as follows. Please refer to FIG. 2 and FIG. 3. FIG. 3 is an assembly diagram of the lens module 14 and the lens fixing mechanism 18 in FIG. 2. As shown in FIG. 2 and FIG. 3, the lens fixing mechanism 18 is disposed in the casing 12 for fixing the lens module 14. The lens fixing mechanism 18 includes a lens base 20 and a lens clamp 22. The lens base 20 has a hollow structure 24 and a breach structure 26. The breach structure 26 is formed on a periphery 25 of the hollow structure 24. The lens clamp 22 could have a ring portion 28 and two sheets 30. The ring portion 28 has an opening 32 and a protruding structure 34. The two sheets 30 extend outwardly from the opening 32 of the ring portion 28 respectively and face each other. The protruding structure 34 protrudes from a periphery 29 of the ring portion 28 toward a center of the ring portion 28. To be more specific, in this embodiment, the breach structure 26 could include three breaches 27, and the protruding structure 34 could include three bumps 35. The three breaches 27 are alternately formed on the periphery 25 of the hollow structure 24 in a radial arrangement (preferably, the three breaches are spaced at the same distance on the periphery 25 of the hollow structure 24, but not limited thereto). The three bumps 35 are alternately formed on the periphery 29 of the ring portion 28 in a radial arrangement corresponding to the three breaches 27. Furthermore, in practical application, as shown in FIG. 2, a chamfering angle 33 is preferably formed on a corner side of each bump 35 which first contacts the lens module 14 when the lens module 14 passes through the lens clamp 22, so as to efficiently prevent structural interference between the lens module 14 and the lens clamp 22. To be noted, in this embodiment, the two sheets 30 could be preferably connected to each other in a screw locking manner (e.g. utilizing a screw 31 to lock the two sheets 30 as shown in FIG. 3) to pack the ring portion 28 to contract inwardly, but not limited thereto, meaning that all designs in which the two sheets 30 could be connected to each other for packing the ring portion 28 to contract inwardly could be adopted by the present invention. For example, in another embodiment, the two sheets 30 could be connected to each other by structural engagement (e.g. hook-and-hole engagement), and the related description is omitted herein since it is commonly seen in the prior art.

Figure 4:
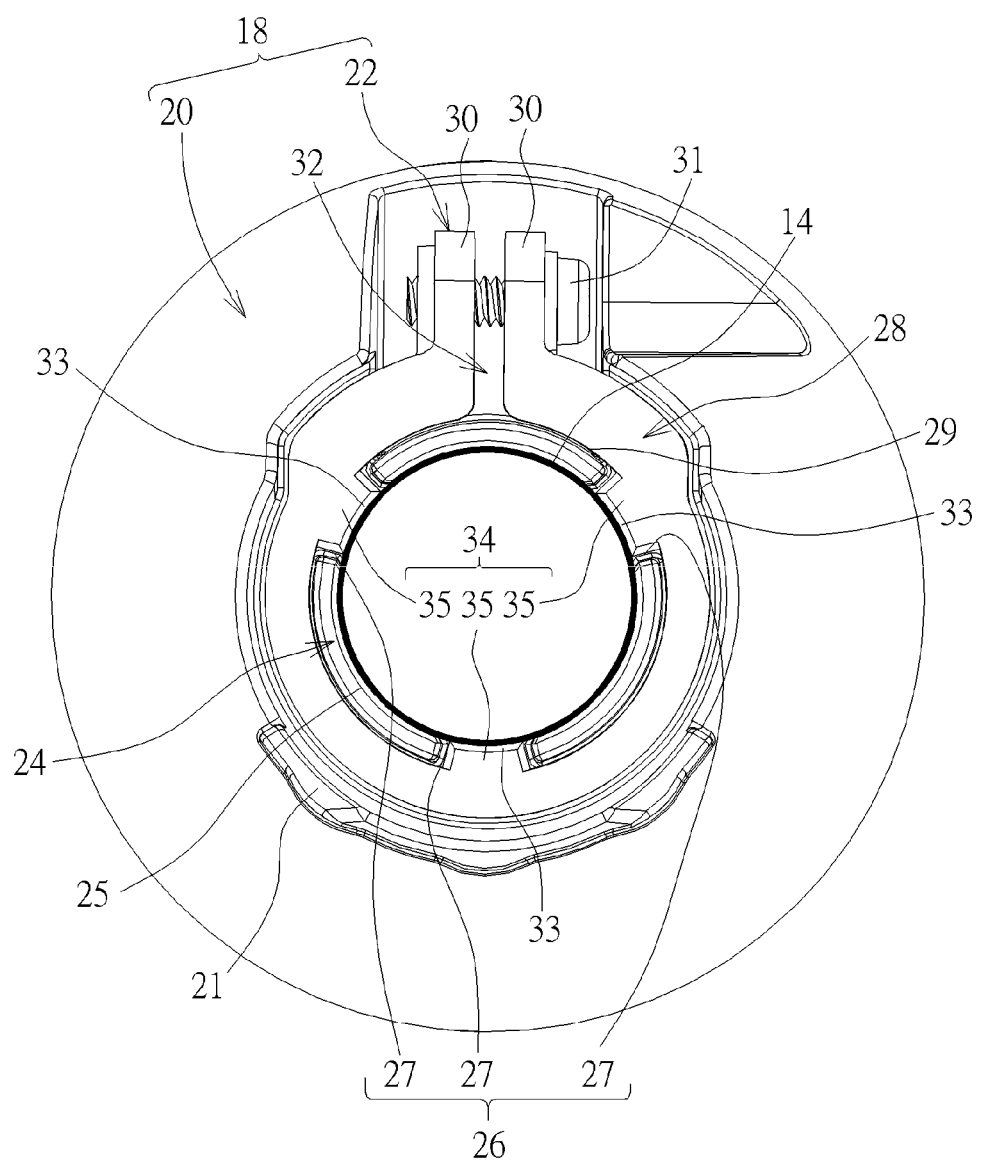
FIG. 4 is a front view of assembly of the lens module and the lens fixing mechanism.

Please refer to FIG. 2, FIG. 3, and FIG. 4. FIG. 4 is a front view of assembly of the lens module 14 and the lens fixing mechanism 18. For clearly showing the structural relationship among the lens module 14, the lens base 20 and the lens clamp 22, the lens module 14 is briefly depicted by bold black lines in FIG. 4. As shown in FIG. 2, FIG. 3, and FIG. 4, via the aforesaid design, when a user wants to utilize the lens fixing mechanism 18 to fix the lens module 14, the user just needs to sleeve the ring portion 28 on the hollow structure 24 of the lens base 20 to insert the three bumps 35 into the three breaches 27 respectively, and then inserts the lens module 14 into the hollow structure 24 (e.g. screwing the lens module 14 into the hollow structure 24, but not limited thereto). Subsequently, the user could utilize the screw 31 to lock the two sheets 30. During the aforesaid locking process, the two sheets 30 locked by the screw 31 could pack the ring portion 28 to contract inwardly relative to the hollow structure 24, so as to make the three bumps 35 pass through the three breaches 27 for clamping the lens module 14 (as shown in FIG. 4). Simultaneously, a portion of the periphery 29 of the ring portion 28 except the three bumps 35 could clamp a portion of the periphery 25 of the hollow structure 24 except the three breaches 27. Via the design that the three bumps 35 passes through the three breaches respectively to clamp the lens module 14 cooperatively in a three-point contact manner and the ring portion 28 partially clamps the hollow structure 24, the lens module 14 could be steadily fixed in the lens base 20 under a uniform clamping force. In such a manner, the present invention could efficiently solve the prior art problems that deflection of the lens module could occur due to the uneven screwing force, uneven coating of the damping oil or elliptical deformation of the C-shaped clamp and the lens module could be damaged by excessive screwing force, so as to greatly improve the image capturing quality of the image capturing device. Furthermore, since there is no need to pack the lens base for causing inward deformation of the lens base for clamping the lens module, the lens clamp provided by the present invention could be suitable for different types of lens bases (e.g. a metal lens base or a plastic lens base), so as to solve the prior art problem that the C-shaped clamp is unable to deform the lens base if the lens base is made of material with high hardness (e.g. metal). Accordingly, flexibility of the lens fixing mechanism provided by the present invention in practical application could be enhanced.

Furthermore, in practical application, as shown in FIG. 1 and FIG. 3, the lens base 20 could have a light blocking sheet 21 formed at a side of the lens module 14, and the light blocking sheet 21 could extend forwardly along an optical axis L of the lens module 14, so as to prevent scattering light from being incident to the lens module 14. Moreover, the user could grasp the light blocking sheet 21 to rotate the lens base 20 for adjusting an image capturing angle of the lens module 14 fixed to the lens base 20, so as to improve the operational convenience of the image capturing device 10. The aforesaid optical axis L is a virtual axis and invisible to the human eye.

It should be mentioned that amount of the breach on the hollow structure and amount of the bump on the ring portion of the lens clamp could be not limited to the aforesaid embodiment. For example, please refer to FIG. 5, which is a front view of assembly of the lens module 14 and a lens fixing mechanism 18' according to another embodiment of the present invention. For clearly showing the mechanical relationship between the lens fixing mechanism 18' and the lens module 14, the lens module 14 is briefly depicted by bold black lines in FIG. 5. Components both mentioned in this embodiment and the aforesaid embodiment with the same index numbers represent components with similar functions or structures.

Figure 5:
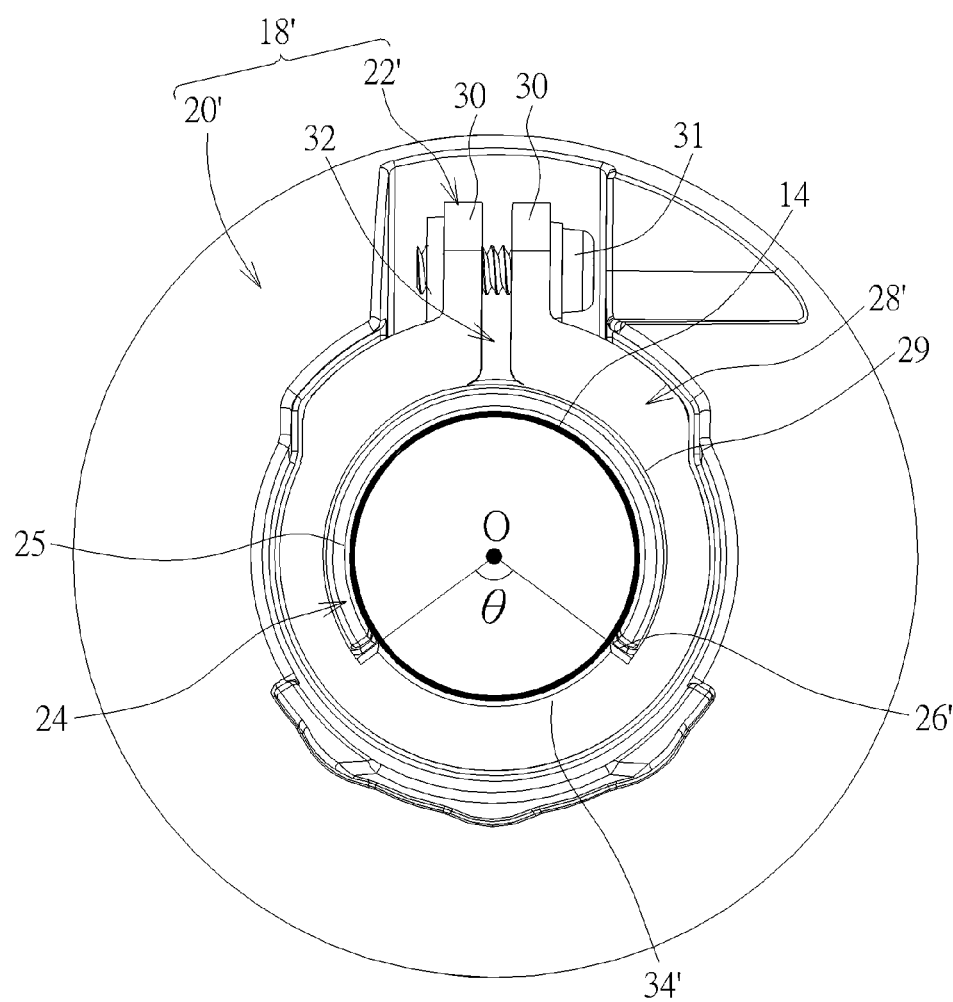
FIG. 5 is a front view of assembly of the lens module and a lens fixing mechanism according to another embodiment of the present invention.

As shown in FIG. 5, the lens fixing mechanism 18' includes a lens base 20' and a lens clamp 22'. The lens base 20' has the hollow structure 24 and a breach structure 26'. The breach structure 26' could be one single breach formed on the hollow structure 24. The lens clamp 22' could have a ring portion 28' and the two sheets 30. The ring portion 28' could have the opening 32 and a protruding structure 34'. The protruding structure 34' could be one single bump protruding from the ring portion 28' toward a center O of the ring portion 28'. A central angle θ of the protruding structure 34' relative to the center O of the ring portion 28' is preferably less than 180° (as shown in FIG. 5, but not limited thereto), so as to make the lens clamp 22' steadily clamp the hollow structure 24 of the lens base 20' and the lens module 14. Via the aforesaid design, when the user wants to utilize the lens fixing mechanism 18' to fix the lens module 14, the user just needs to sleeve the ring portion 28' on the hollow structure 24 of the lens base 20' to insert the protruding structure 34' into the breach structure 26', and then inserts the lens module 14 into the hollow structure 24 (e.g. screwing the lens module 14 into the hollow structure 24, but not limited thereto). Subsequently, the user could utilize the screw 31 to lock the two sheets 30. During the aforesaid locking process, the two sheets 30 locked by the screw 31 could pack the ring portion 28' to contract inwardly relative to the hollow structure 24, so as to make the protruding structure 34' pass through the breach structure 26' for clamping the lens module 14 (as shown in FIG. 5). Simultaneously, a portion of the periphery 29 of the ring portion 28' except the protruding structure 34' could clamp a portion of the periphery 25 of the hollow structure 24 except the breach structure 26'. Via the design that the protruding structure 34' passes through the breach structure 26' to clamp the lens module 14 and the ring portion 28' partially clamps the hollow structure 24, the lens module 14 could be steadily fixed to the lens base 20' under a uniform clamping force. As for other derived embodiments (e.g. an embodiment that the breach structure could include four breaches and the protruding structure could include four bumps), the related description could be reasoned by analogy according to the aforesaid embodiments and omitted herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lens fixing mechanism for fixing a lens module, the lens fixing mechanism comprising:
    a lens base having a hollow structure and a breach structure, the breach structure being formed on a periphery of the hollow structure; and
    a lens clamp having a ring portion and two sheets, the ring portion having an opening and a protruding structure, the two sheets extending outwardly from the opening of the ring portion, the protruding structure protruding from a periphery of the ring portion toward a center of the ring portion;
    wherein when the ring portion sleeves the hollow structure to insert the protruding structure into the breach structure and the lens module is inserted into the hollow structure, the two sheets are connected to each other to pack the ring portion to contract inwardly relative to the hollow structure, so as to make the protruding structure pass through the breach structure for clamping the lens module and make a portion of the periphery of the ring portion except the protruding structure to clamp a portion of a periphery of the hollow structure except the breach structure.

2. The lens fixing mechanism of claim 1, wherein the breach structure comprises three breaches, the protruding structure comprises three bumps, the three breaches are formed alternately on the periphery of the hollow structure in a radial arrangement, the three bumps are alternately formed on the periphery of the ring portion in a radial arrangement corresponding to the three breaches, and when the ring portion sleeves the hollow structure to insert the three bumps into the three breaches respectively and the lens module is inserted into the hollow structure, the two sheets are connected to each other to pack the ring portion to contract inwardly relative to the hollow structure, so as to make the three bumps pass through the three breaches for clamping the lens module and make the portion of the periphery of the ring portion except the three bumps to clamp the portion of the periphery of the hollow structure except the three breaches.

3. The lens fixing mechanism of claim 2, wherein the three breaches are spaced at the same distance.

4. The lens fixing mechanism of claim 1, wherein the two sheets are connected to each other in a screw locking manner for packing the ring portion to contract inwardly.

5. The lens fixing mechanism of claim 1, wherein a chamfering angle is formed on a corner side of the protruding structure corresponding to the lens module.

6. The lens fixing mechanism of claim 1, wherein the lens base has a light blocking sheet formed at a side of the lens module, and the light blocking sheet extends forwardly along an optical axis of the lens module.

7. An image capturing device comprising:
    a casing;
    a lens module disposed in the casing;
    a lens fixing mechanism disposed in the casing for fixing the lens module, the lens fixing mechanism comprising:
        a lens base having a hollow structure and a breach structure, the breach structure being formed on a periphery of the hollow structure; and
        a lens clamp having a ring portion and two sheets, the ring portion having an opening and a protruding structure, the two sheets extending outwardly from the opening of the ring portion, the protruding structure protruding from a periphery of the ring portion toward a center of the ring portion; and
    a sensing circuit board disposed in the casing, the sensing circuit board having an image sensor disposed thereon, the image sensor being aligned with the lens module;
    wherein when the ring portion sleeves the hollow structure to insert the protruding structure into the breach structure and the lens module is inserted into the hollow structure, the two sheets are connected to each other to pack the ring portion to contract inwardly relative to the hollow structure, so as to make the protruding structure pass through the breach structure for clamping the lens module and make a portion of the periphery of the ring portion except the protruding structure to clamp a portion of a periphery of the hollow structure except the breach structure.

8. The image capturing device of claim 7, wherein the breach structure comprises three breaches, the protruding structure comprises three bumps, the three breaches are formed alternately on the periphery of the hollow structure in a radial arrangement, the three bumps are alternately formed on the periphery of the ring portion in a radial arrangement corresponding to the three breaches, and when the ring portion sleeves the hollow structure to insert the three bumps into the three breaches respectively and the lens module is inserted into the hollow structure, the two sheets are connected to each other to pack the ring portion to contract inwardly relative to the hollow structure, so as to make the three bumps pass through the three breaches for clamping the lens module and make the portion of the periphery of the ring portion except the three bumps to clamp the portion of the periphery of the hollow structure except the three breaches.

9. The image capturing device of claim 8, wherein the three breaches are spaced at the same distance.

10. The image capturing device of claim 7, wherein the two sheets are connected to each other in a screw locking manner for packing the ring portion to contract inwardly.

11. The image capturing device of claim 7, wherein a chamfering angle is formed on a corner side of the protruding structure corresponding to the lens module.

12. The image capturing device of claim 7, wherein the lens base has a light blocking sheet formed at a side of the lens module, and the light blocking sheet extends forwardly along an optical axis of the lens module.

\* \* \* \* \*